United States Patent
Park et al.

(10) Patent No.: US 10,694,412 B2
(45) Date of Patent: Jun. 23, 2020

(54) METHOD FOR TRANSMITTING AND RECEIVING CHANNEL MEASUREMENT INFORMATION IN WIRELESS LAN SYSTEM AND DEVICE FOR SAME

(71) Applicant: LG ELECTRONICS INC., Seoul (KR)

(72) Inventors: Sungjin Park, Seoul (KR); Jinmin Kim, Seoul (KR); Sunwoong Yun, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/332,339

(22) PCT Filed: Nov. 26, 2018

(86) PCT No.: PCT/KR2018/014612
§ 371 (c)(1),
(2) Date: Mar. 11, 2019

(87) PCT Pub. No.: WO2019/107848
PCT Pub. Date: Jun. 6, 2019

(65) Prior Publication Data
US 2019/0246302 A1 Aug. 8, 2019

Related U.S. Application Data

(60) Provisional application No. 62/593,259, filed on Dec. 1, 2017, provisional application No. 62/593,269, filed (Continued)

(30) Foreign Application Priority Data

Mar. 23, 2018 (KR) .................. 10-2018-0034151

(51) Int. Cl.
H04W 24/08 (2009.01)
H04W 84/12 (2009.01)

(52) U.S. Cl.
CPC ............ *H04W 24/08* (2013.01); *H04W 84/12* (2013.01)

(58) Field of Classification Search
CPC .............................. H04W 24/08; H04W 84/12
See application file for complete search history.

(56) References Cited

U.S. PATENT DOCUMENTS 9,178,593 B1 * 11/2015 Liu ................. H04B 7/0834
2010/0331028 A1 * 12/2010 Cordeiro ............ H04B 7/0617
455/509

(Continued)

OTHER PUBLICATIONS

Carlos Cordeiro etc., 'Scheduling for mmWave Distribution Networks', IEEE 802.11-17/1323r2, Sep. 13, 2017 See slide 9 page. (Year: 2017).*

(Continued)

*Primary Examiner* — Kashif Siddiqui
(74) *Attorney, Agent, or Firm* — Lee Hong Degerman Kang & Waimey

(57) ABSTRACT

The present specification discloses a method for transmitting and receiving channel measurement information in a wireless local area network (WLAN) system and a device for the same. More specifically, the present specification describes a method for transmitting and receiving channel measurement information to support a time division duplex (TDD) scheduling scheme, which is a method for transmitting and receiving channel measurement information based on channel measurement per time unit different from that in a conventional method, and a device for the same.

13 Claims, 37 Drawing Sheets

Related U.S. Application Data on Dec. 1, 2017, provisional application No. 62/617,534, filed on Jan. 15, 2018, provisional application No. 62/634,181, filed on Feb. 22, 2018, provisional application No. 62/634,186, filed on Feb. 22, 2018.

(56) References Cited

U.S. PATENT DOCUMENTS

| | | | |
|---|---|---|---|
| 2015/0365156 A1* | 12/2015 | Huang | H04W 72/1231 370/329 |
| 2016/0013997 A1* | 1/2016 | Kim | H04W 24/08 370/252 |
| 2016/0142929 A1* | 5/2016 | Irie | H04W 16/28 370/252 |
| 2016/0302230 A1 | 10/2016 | Novlan et al. | |
| 2017/0188251 A1 | 6/2017 | Kwak | |
| 2019/0053088 A1* | 2/2019 | Jo | H04W 24/10 |

OTHER PUBLICATIONS

PCT International Application No. PCT/KR2018/014612, International Search Report dated Mar. 13, 2019, 5 pages.

Cordeiro, C. et al., "Scheduling for mmWave Distribution Networks", doc.: IEEE 802.11-17/1323r2, Sep. 2017, 26 pages.

Huang, L., "Comment Resolution on Measurement Elements", Resolution for CID 9058 and 90752, doc.: IEEE 802.11-17/0709r2, May 2017, 10 pages.

European Patent Office Application No. 18852704.8, Search Report dated Mar. 3, 2020, 12 pages.

The 802.11 Working Group of the LAN/MAN Standards Committee of the IEEE Computer Society, "Part 11: Wireless LAN Medium Access Control (MAC) and Physical Layer (PHY) Specification," IEEE P802.11-REVmd/D0.3, Sep. 2017, 4314 pages.

LG Electronics Inc., "Channel Measurement for TDD Slots," IEEE 802.11-18/0451r0, Mar. 2018, 12 pages.

LG Electronics Inc., "Comment Resolution on Channel Measurement for TDD Slot," IEEE 802.11-18/0839r0, May 2018, 4 pages.

* cited by examiner

FIG. 9

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: Legacy, GF: Gap Filling, ay: 802.11ay)

FIG. 12

| Element ID | Length | STA Address | AID | DMG STA Capability Information | DMG AP or PCP Capability Information |
|---|---|---|---|---|---|
| Octets: 1 | 1 | 6 | 1 | 8 | 2 |

| DMG STA BeamTracking TimeLimit | Extended SC MCS Capabilities | Maximum Number of Basic A-MSDU Subframes In A-MSDU | Maximum Number of Short A-MSDU Subframes In A-MSDU | TDD Capability Information |
|---|---|---|---|---|
| Octets: 2 | 1 | 1 | 1 | 2 |

FIG. 13

| TDD Channel Access Supported | TDD Link Maintenance Statistics | Reserved |
|---|---|---|
| B0 | B1 B4 | B5 B15 |
| 1 | 4 | 11 |

Bits:

FIG. 14

| B0 B3 | B4 B6 | B7 | B8 | B9 | B10 | B11 | B12 | B13 B15 |
|---|---|---|---|---|---|---|---|---|
| Allocation ID | Allocation Type | Pseudo-static | Truncatable | Extendable | PCP Active | LP SC Used | TDD Applicable SP | Reserved |
| Bits: 4 | 3 | 1 | 1 | 1 | 1 | 1 | 1 | 3 |

FIG. 15

| Element ID | Length | Element ID Extension | Slot Structure Control | Slot Structure Start Time | TDD SP Block Duration | Slot Structure |
|---|---|---|---|---|---|---|
| 1 | 1 | 1 | 4 | 4 | 2 | M |

Octets:

FIG. 16

| B0 | | | B3 | B4 | | B8 | B9 | | B13 | B14 | | B18 | B19 | B22 | B23 | | B31 |
|---|---|---|---|---|---|---|---|---|---|---|---|---|---|---|---|---|---|
| Number of TDD Slots per TDD Interval | | | | GT1 Duration | | | GT2 Duration | | | GT3 Duration | | | Allocation ID | | Reserved | | |
| Bits: 4 | | | | 5 | | | 5 | | | 5 | | | 4 | | 9 | | |

FIG. 17

| TDD Slot 1 Duration | ... | TDD Slot M Duration |
|---|---|---|

Bits: 8 ... 8

FIG. 18

| Element ID | Length | Element ID Extension | Slot Schedule Control | Bitmap and Access Type Schedule | Slot Category Schedule |
|---|---|---|---|---|---|
| Octets: 1 | 1 | 1 | 9 | $\left\lceil \dfrac{Q \times M}{4} \right\rceil$ | $\left\lceil \dfrac{Q \times M}{4} \right\rceil$ |

FIG. 19

| | B0 | B1 B8 | B9 B40 | B41 B50 | B51 B54 | B55 B70 | B71 |
|---|---|---|---|---|---|---|---|
| | Channel Aggregation | BW | Slot Schedule Start Time | Number of TDD Intervals in the Bitmap | Allocation ID | TDD Slot Schedule Duration | Reserved |
| Bits: | 1 | 5 | 32 | 10 | 4 | 16 | 1 |

FIG. 22

| Operating Class | Channel Number | AID | Reserved | Measurement Method |
|---|---|---|---|---|

Octets: 1 1 1 1 1

| Measurement Start Time | Measurement Duration | Number of Time Blocks | Optional Subelements |
|---|---|---|---|

Octets: 8 2 1 Variable

FIG. 23

| Operating Class | Channel Number | AID | Reserved | Measurement Method | Measurement Start Time |
|---|---|---|---|---|---|
| 1 | 1 | 1 | 1 | 1 | 8 |

Octets:

| Measurement Duration | Number of Time Blocks (N) | Measurement for Time Block 1 | ... | Measurement for Time Block N | Optional Subelements |
|---|---|---|---|---|---|
| 2 | 1 | 1 | | 1 | Variable |

Octets:

FIG. 24
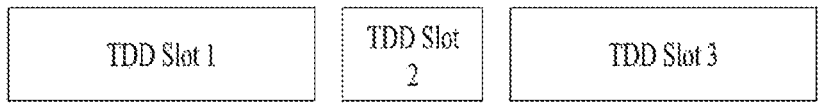
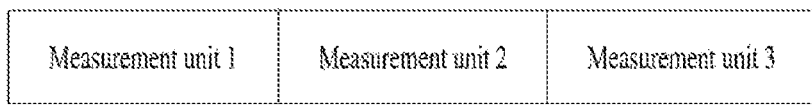
Measurement duration
When measurement unit is same duration with TDD slot 1
- TDD slot 2 cannot be measured properly since Measurement unit 2 includes the part of duration of TDD slot 3
- TDD slot 3 cannot be measured accurately since Measurement unit 3 is shorter than the duration of TDD slot 3

FIG. 28

| Element ID | Length | Element ID Extension | Measurement Control | Reserved | Measurement Bitmap |
|---|---|---|---|---|---|

Octets: 1　　1　　1　　8　　5　　$\lceil \frac{Q \times M}{8} \rceil$

FIG. 29

| Measurement Channel Bitmap | Channel Measurement Report Method | Antenna Measurement Report Method | Measurement Start Time | Number of TDD Intervals in the Bitmap | Allocation ID | Reserved |
|---|---|---|---|---|---|---|
| Bits: 8 | 1 | 1 | 32 | 10 | 4 | 8 |

FIG. 30

| Measurement Bitmap |

$$\left\lceil \frac{Q}{8} \right\rceil$$

FIG. 31

| Measurement Bitmap | Number of RX Antennas for 1st Reported Channel ($N_{RX,1}$) | Measurement Results for 1st Reported Channel | Number of RX Antennas for 2nd Reported Channel ($N_{RX,2}$) | Measurement Results for 2nd Reported Channel | ... | Number of RX Antennas for $N_{ch}^{th}$ Reported Channel ($N_{RX,Nch}$) | Measurement Results for $N_{ch}^{th}$ Reported Channel |
|---|---|---|---|---|---|---|---|
| 3110 | 3120 #1 | 3130 #1 | 3120 #2 | 3130 #2 | | 3120 #N | 3130 #N |

Octets: $\lceil \frac{Q \times M}{8} \rceil$, 1, $N \times (N_{RX,1})$, 1, $N \times (N_{RX,2})$, 1, $N \times N_{RX,Nch}$

FIG. 32

| Measurement Bitmap | Measurement Results for 1st Reported Channel | Measurement Results for 2nd Reported Channel | ... | Measurement Results for $N_{ch}^{th}$ Reported Channel |
|---|---|---|---|---|

Octets: $\left\lceil \frac{Q \times M}{8} \right\rceil$  N  N  N

FIG. 33

| Measurement Bitmap | Number of Rx Antennas ($N_{RX}$) | Measurement Results for 1st RX DMG Antenna | Measurement Results for 2nd RX DMG Antenna | ... | Measurement Results for $N_{RX}$ RX DMG Antenna |
|---|---|---|---|---|---|
| Octets: $\lceil \frac{Q \times M}{8} \rceil$ | 1 | N | N | | N |

METHOD FOR TRANSMITTING AND RECEIVING CHANNEL MEASUREMENT INFORMATION IN WIRELESS LAN SYSTEM AND DEVICE FOR SAME

CROSS-REFERENCE TO RELATED APPLICATIONS

This application is the National Stage filing under 35 U.S.C. 371 of International Application No. PCT/KR2018/014612, filed on Nov. 26, 2018, which claims the benefit of earlier filing date and right of priority to Korean Application No. 10-2018-0034151, filed on Mar. 23, 2018, and also claims the benefit of U.S. Provisional Application No. 62/593,259, filed on Dec. 1, 2017, 62/593,269, filed on Dec. 1, 2017, 62/617,534, filed on Jan. 15, 2018, 62/634,181, filed on Feb. 22, 2018, and 62/634,186, filed on Feb. 22, 2018, the contents of which are all hereby incorporated by reference herein in their entirety.

BACKGROUND OF THE INVENTION

Field of the Invention

The following description relates to a method for transmitting and receiving channel measurement information in a wireless local area network (WLAN) system and a device for the same.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

The present invention proposes a method by which station devices TDD-scheduled according to a TDD scheduling method transmits and receives channel measurement information, and a device for the same.

One aspect of the present invention proposes a method for transmitting, by a station (STA), channel measurement information in a wireless local area network (WLAN) system, the method including: receiving a measurement request signal to request channel measurement per (in a unit of) time unit (TU)/1024 from an access point (AP); and transmitting channel measurement information to the AP, wherein the channel measurement information is measured based on a First Measurement Duration field included in the measurement request signal, wherein the First Measurement Duration field comprises information on a requested measurement duration per the TU/1024.

The measurement request signal to request channel measurement per (in a unit of) TU/1024 may include information on (indicating) that the measurement request signal is a measurement request signal for channel measurement per (in a unit of) TU/1024.

The information on (indicating) that the measurement request signal is the measurement request signal channel measurement per (in a unit of) TU/1024 may be received through a First Measurement Method field included in the measurement request signal.

For example, upon receiving the First Measurement Method field associated with an average noise plus interference power indicator (ANIPI) during the requested measurement duration in a unit of TU/1024, the STA may transmit the channel measurement information including an ANIPI measured during the requested measurement duration to the AP.

The First Measurement Method field associated with the ANIPI during the requested measurement duration in a unit of TU/1024 may be set to 2.

In this case, the channel measurement information may include: a Second Measurement Method field indicating (or including information on) that the channel measurement information is represented by the ANIPI during the requested measurement duration; and a Second Measurement Duration field indicating (or including information on) the requested measurement duration in a unit of TU/1024.

In another example, upon receiving the Measurement Method field associated with a received signal-to-noise indicator (RSNI) during the requested measurement duration in a unit of TU/1024, the STA may transmit the channel measurement information including an RSNI measured during the requested measurement duration to the AP.

Here, the Measurement Method field associated with the RSNI during the requested measurement duration in a unit of TU/1024 may be set to 3.

In this case, the channel measurement information may include: a Second Measurement Method field indicating (or including information on) that the channel measurement information is represented by the RSNI during the requested measurement duration; and a Second Measurement Duration field indicating (or including information on) the requested measurement duration in a unit of TU/1024.

In the present invention, a time interval in which the channel measurement is performed may be included in a service period (SP) included in a data transfer interval (DTI).

In the present invention, the TU/1024 may be equal to 1 microsecond.

Another aspect of the present invention proposes a method for receiving, by an AP, channel measurement information from an STA in a wireless local area network (WLAN) system, the method including: transmitting a measurement request signal to request channel measurement per (in a unit of) TU/1024 to the STA; and receiving channel measurement information from the STA, wherein the channel measurement information is measured based on a first measurement duration field included in the measurement request signal, wherein the First Measurement Duration field comprises information on a requested measurement duration per the TU/1024.

The channel measurement information may include a Second Measurement Duration field indicating (or including information on) the requested measurement duration in a unit of TU/1024.

The measurement request signal may include a First Measurement Method field indicating (or including information on) an ANIPI or an RSNI as a measurement method during the requested measurement duration in the unit of TU/1024, and the channel measurement information may include a Second Measurement Method field indicating (or including information on) that the channel measurement information is represented by the ANIPI or the RSNI as the measurement method during the requested measurement duration.

The AP may perform time division duplex (TDD) slot scheduling for the STA based on the channel measurement information.

Still another aspect of the present invention proposes a communication device that transmits channel measurement information in a WLAN system, the communication device including: a memory; and a processor connected to the memory and to process a signal transmitted to and received from another station device, wherein the processor is configured to: receive a measurement request signal to request channel measurement per (in a unit of) TU/1024 from an AP; and transmit channel measurement information to the AP, and the channel measurement information is measured based on a First Measurement Duration field included in the measurement request signal, wherein the First Measurement Duration field comprises information on a requested measurement duration per the TU/1024.

Yet another aspect of the present invention proposes a communication device that receives channel measurement information in a WLAN system, the communication device including: a memory; and a processor connected to the memory and to process a signal transmitted to and received from another station device, wherein the processor is configured to: transmit a measurement request signal to request channel measurement per (in a unit of) TU/1024 to the STA; and receive channel measurement information from the STA, and the channel measurement information is measured based on a First Measurement Duration field included in the measurement request signal, wherein the First Measurement Duration field comprises information on a requested measurement duration per the TU/1024.

The effects of the present invention will not be limited only to the effects described above. Accordingly, effects that have not been mentioned above or additional effects of the present application may become apparent to those having ordinary skill in the art from the description presented below.

With the foregoing configuration, a station device supporting the 802.11ay system applicable to the present invention can transmit and receive channel measurement information suitable for a TDD SP structure.

More specifically, according to the present invention, it is possible to support channel measurement per (in a unit of) TU/1024 (or 1 μsec), which is not supported by the prior art, and it is possible to support flexible TDD slot scheduling using channel measurement per (in a unit of) TU/1024 (or 1 μsec).

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The appended drawings of this specification are presented to provide a further understanding of the present invention and are incorporated in and constitute a part of this application, illustrate embodiments of the invention and serve to explain the principle of the invention along with the description of the present invention.

FIG. 9 is a diagram showing a PPDU structure that can be applied to the present invention.

FIG. 12 is a diagram schematically illustrating an STA capability element that an STA can transmit to an AP or PCP to support a TDD operation, and FIG. 13 is a diagram schematically illustrating a TDD Capability Information field in the STA capability element.

FIG. 14 is a diagram schematically illustrating an extended schedule element applicable to the present invention.

FIG. 15 is a diagram schematically illustrating a TDD slot structure element applicable to the present invention, FIG. 16 is a diagram schematically illustrating a Slot Structure Control field in the TDD slot structure element, and FIG. 17 is a diagram schematically illustrating a Slot Structure field in the TDD slot structure element.

FIG. 18 is a diagram schematically illustrating a TDD slot schedule element applicable to the present invention, and FIG. 19 is a diagram schematically illustrating a Slot Schedule Control field in the TDD slot schedule element.

FIG. 22 is a diagram schematically illustrating a measurement request element according to a related art, and FIG. 23 is a diagram schematically illustrating a measurement report element according to a related art.

FIGS. 24 to 26 illustrate examples of setting a measurement unit to various TDD slot lengths.

FIG. 28 is a diagram schematically illustrating an element format for requesting channel measurement per TDD slot according to another embodiment of the present invention, and FIG. 29 is a diagram schematically illustrating a Measurement Control field in FIG. 28.

FIG. 30 is a diagram schematically illustrating an element format for requesting channel measurement per TDD interval according to the present invention.

FIGS. 31 to 33 are diagrams schematically illustrating a frame format that is applicable depending on the value of a Channel Measurement Report Method subfield and the value of an Antenna Measurement Report Method subfield.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System 1-1. General Wireless LAN (WLAN) System

Figure 1:
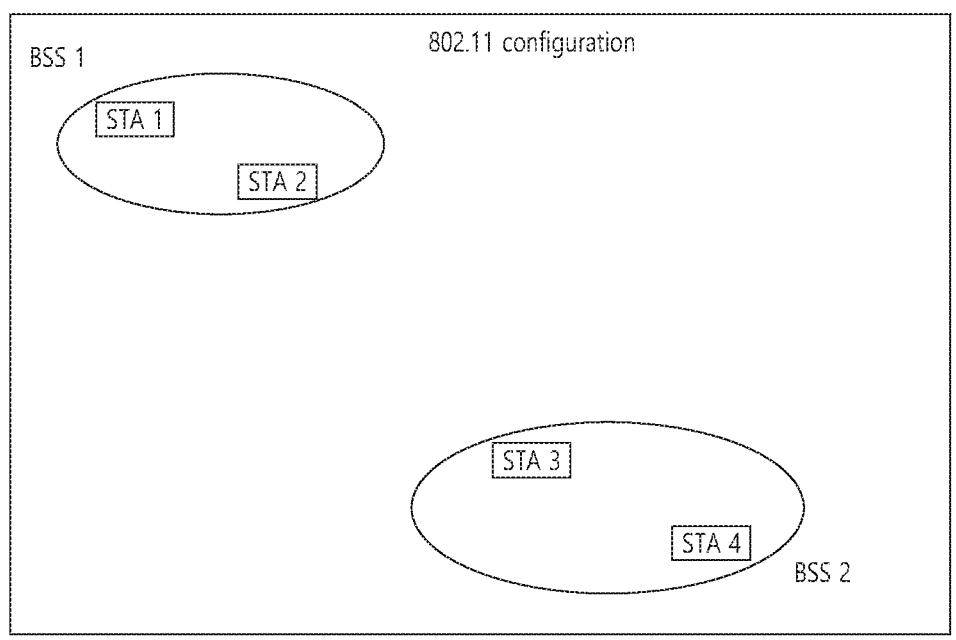
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
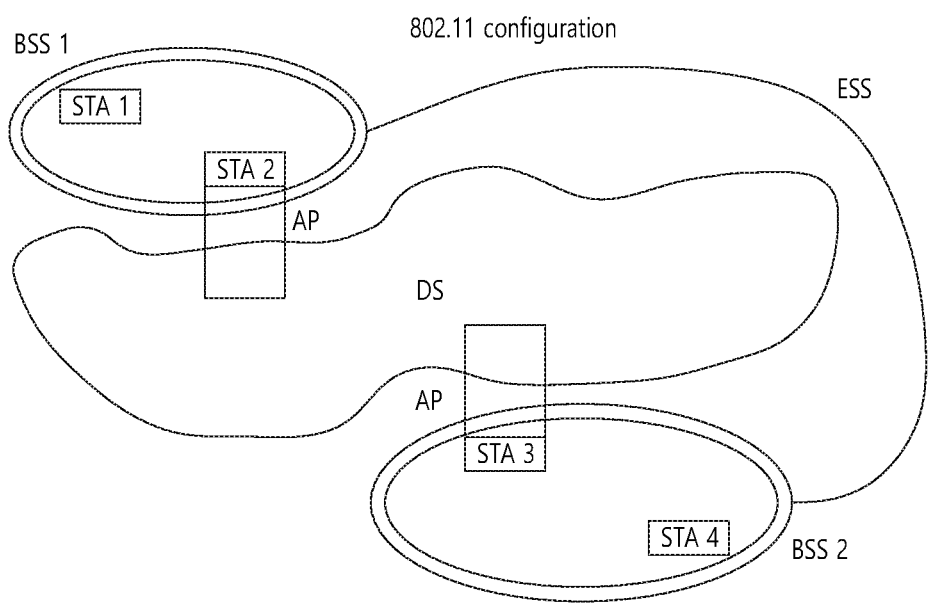
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
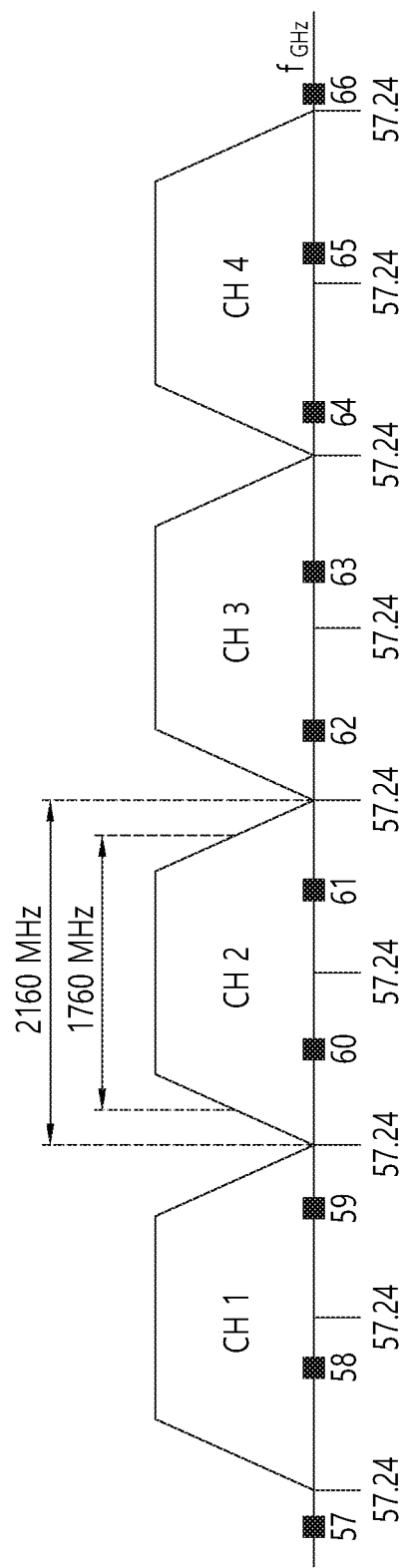
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz-66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
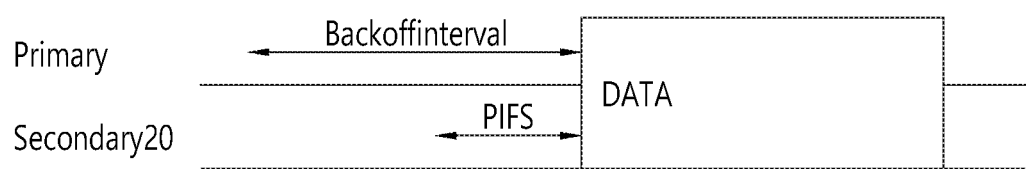
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
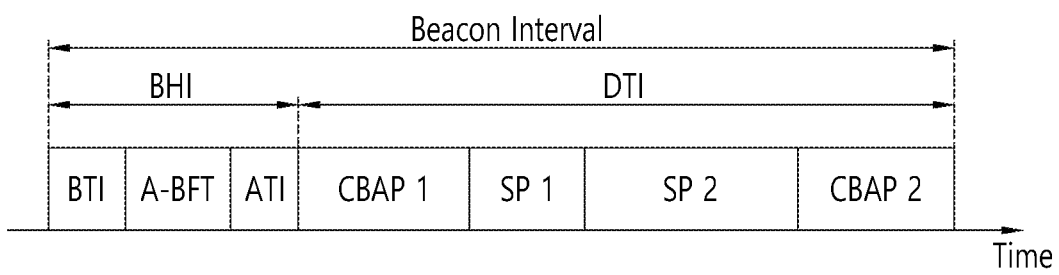
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
|---|---|---|
| Control PHY | 0 | |
| Single carrier PHY (SC PHY) | 1 ... 12 25 ... 31 | (low power SC PHY) |
| OFDM PHY | 13 ... 24 | |

Such modulation modes may be used for satisfying different requirements (e.g., high throughput or stability). Depending upon the system, among the modulation modes presented above, only some of the modulation modes may be supported.

Figure 6:
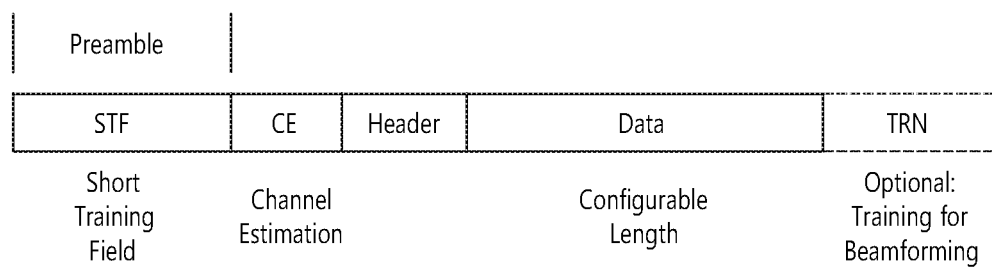
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
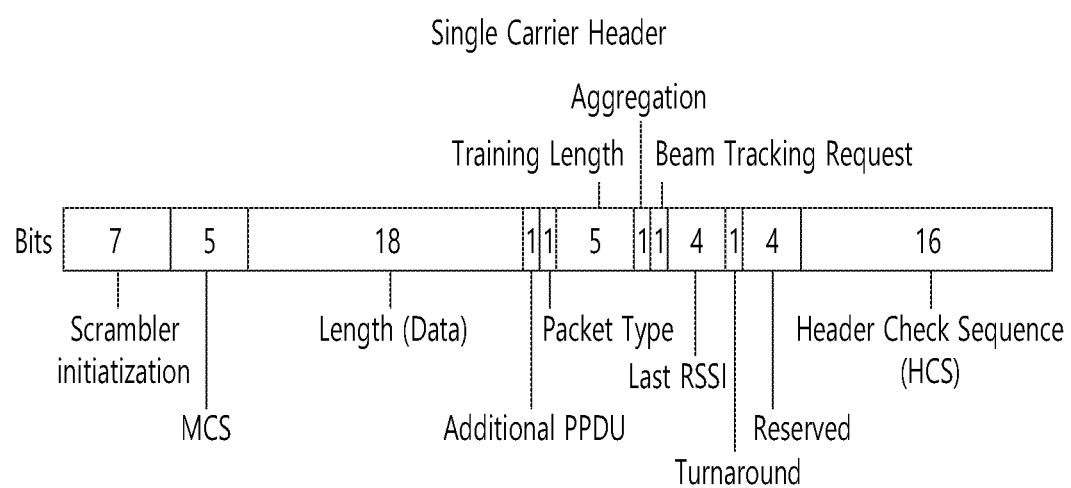
FIG. 7 and FIG. 8 are diagrams describing a configuration of a header field of the radio frame shown in FIG. 6.
Figure 8:
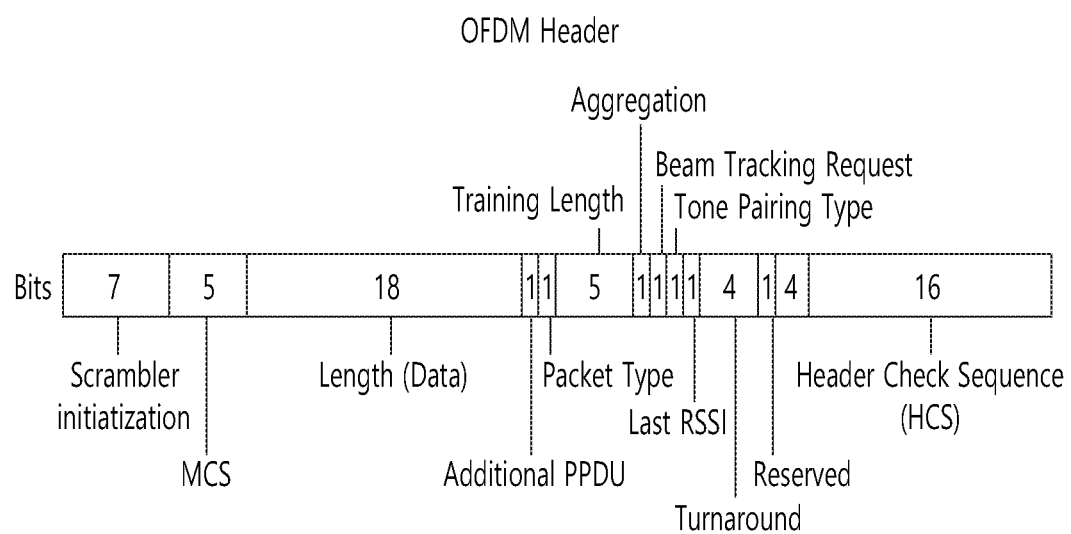

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information on (indicating) an initial value of scrambling, information on (indicating) a Modulation and Coding Scheme (MCS) and a data length, information on (indicating) the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information on (indicating) an initial value of scrambling, information on (indicating) a MCS and a data length, information on (indicating) the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
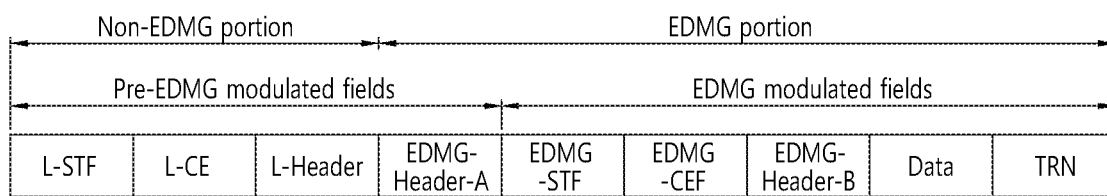
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble part of the PPDU may be used for packet detection, automatic gain control (AGC), frequency offset estimation, synchronization, indication of modulation (SC or OFDM), and channel estimation. A format of the preamble may be common to both OFDM packets and SC packets. Here, the preamble may include a short training field (STF) and a channel estimation (CE) field.

2. TDD Scheduling Method to which the Present Invention is Applicable

The 802.11ay system, to which the present invention is applicable, can support time division duplex (TDD) scheduling for one or more STAs using a service period (SP) in a DTI, which will be described in more detail as follows.

Figure 11:
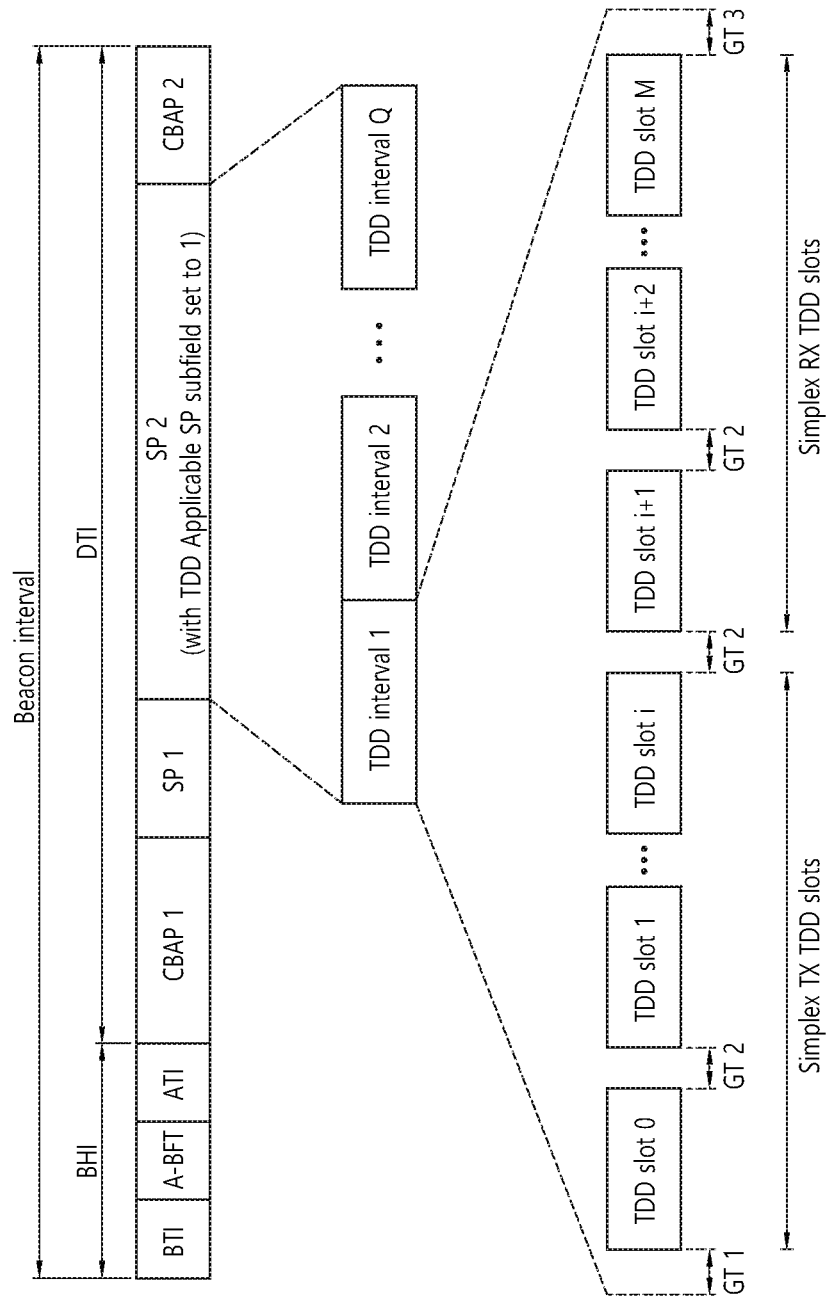
FIG. 11 is a diagram schematically illustrating a TDD service period (SP) structure according to an embodiment of the present invention.

FIG. 11 is a diagram schematically illustrating a TDD service period (SP) structure according to an embodiment of the present invention.

A directional multi-gigabit (DMG) AP or a DMG personal basic service set (PB SS) control point (PCP) may set an Allocation Type subfield and a TDD Applicable SP subfield, which are present in an Allocation field included in an extended schedule element, to 0 and 1, respectively, in order to indicate TDD SP allocation.

When allocating a TDD SP, the AP or the PCP may set both a source association identity (AID) and a destination AID in a corresponding Allocation field to 0.

When the extended schedule element includes at least one TDD SP, the DMG AP or the DMG PCP transmits each (DMBG) beacon frame including an extended schedule element.

As shown in FIG. 11, one TDD SP includes one or more consecutive TDD intervals. One TDD interval includes one or more TDD slots.

Parameters for a TDD structure and a guard time used in the TDD SP are defined by a TDD slot structure element. The DMG AP or the DMG PCP transmits the TDD slot structure element to each (DMG) STA that expects to transmit and receive relevant signals during the TDD SP. The TDD slot structure element may be included in a (DMG) beacon frame or an announcement frame transmitted by the DMG AP or the DMG PCP. If allocations identified by an Allocation ID subfield in the TDD slot structure element received by a (DMG) STA correspond to the (DMG) STA, the (DMG) STA adopts a TDD structure in the TDD slot structure element for all TDD SPs identified by the same Allocation ID subfield until the (DMG) STA receives an updated TDD slot structure element from the DMG AP or the DMG PCP. The TDD structure may be adopted in a time indicated by the value of a Slot Structure Start Time subfield in the TDD slot structure element.

If not receiving a TDD slot schedule element indicating that at least one TDD slot is allocated in the TDD SP by the DMG AP or the DMG PCP, the (DMG) STA does not transmit a related signal during the TDD SP. The DMG AP or DMG PCP transmits the TDD slot schedule element to each (DMG) STA that is allocated to access the TDD SP through an announcement frame or an association response frame before a time indicated by the value of a slot schedule start time in the TDD slot schedule element. If allocations identified by an Allocation ID subfield in the TDD slot schedule element received by the (DMG) STA correspond to the (DMG) STA, the (DMG) STA adopts a schedule in the TDD slot schedule element in a time indicated by the value of a Slot Schedule Start Time subfield in the TDD slot schedule element.

As shown in FIG. 11, the type of the TDD slot may be one of a simplex TX slot, a simplex RX slot, and an unassigned slot. The operation of the DMG AP or DMP PCP in the TDD slot is different from the operations of a non-AP STA and a non-PCP STA depending on whether the TDD slot is for simplex TX or simplex RX except for an unassigned TDD slot in which no signal is transmitted.

At the start of a simplex TX TDD slot, the DMG AP or the DMG PCP starts to transmit an allocated (or addressed) signal to the non-AP STA or the non-PCP STA allocated to the TDD slot, and the non-AP STA or the non-PCP STA, which is allocated to the TDD slot, is beamformed toward the DMG AP or the DMG PCP to receive the signal from the DMG AP or the DMG PCP and maintains the receiving state during the TDD slot.

At the start of a simplex RX TDD slot, the non-AP STA or the non-PCP STA allocated to the TDD slot starts to transmit an allocated (or addressed) signal to the DMG AP or the DMG PCP, and the DMG AP or the DMG PCP is beamformed towards the STA to receive the signal from the STA and maintains a receiving state during the TDD slot.

That is, in simplex TX TDD slots, only DL transmission (i.e., signal transmission from the PCP/AP to the STA) is allowed. On the contrary, in simplex RX TDD slots, only UL transmission (i.e., signal transmission from the STA to the PCP/AP) is allowed.

As shown in FIG. 11, adjacent TDD slots are spaced apart by a guard time of a certain length. The guard time (GT1, GT2, and GT3) is defined by the TDD slot structure element.

In the TDD SP, a reverse-direction protocol is not applied.

Accordingly, the TDD SP may refer to an SP having a TDD Applicable SP subfield of 1 in the Allocation field included in the extended schedule element. Further, a source/destination (DMG) STA may refer to an (DMG) STA that expects to transmit and receive signals at the start of a corresponding TDD slot in an SP having a TDD Applicable SP subfield of 1.

FIG. 12 is a diagram schematically illustrating an STA capability element that an STA can transmit to an AP or PCP to support a TDD operation, and FIG. 13 is a diagram schematically illustrating a TDD Capability Information field in the STA capability element.

For the TDD operation described above, the STA according to the present invention may transmit STA capability information (e.g., DMG STA capabilities element) shown in FIG. 12 to the PCP/AP. Here, a TDD Capability Information field shown in FIG. 12 may be configured as shown in FIG. 13 to indicate capabilities of the transmitting STA in supporting TDD features. Here, a TDD Channel Access Supported subfield is set to 1 if the STA supports the foregoing TDD channel access. Otherwise, this subfield is set to 0.

FIG. 14 is a diagram schematically illustrating an extended schedule element applicable to the present invention.

As described above, a TDD Applicable SP subfield in the extended schedule element is set to 1 if corresponding SPP allocation uses TDD channel access. Otherwise, this subfield is set to 0.

FIG. 15 is a diagram schematically illustrating a TDD slot structure element applicable to the present invention, FIG. 16 is a diagram schematically illustrating a Slot Structure Control field in the TDD slot structure element, and FIG. 17 is a diagram schematically illustrating a Slot Structure field in the TDD slot structure element. In FIGS. 15 and 17, a TDD SP Block Duration field may be replaced with an Allocation Block Duration field, and a Slot Structure field may be replaced with a Slot Schedule field.

The TDD SP structure shown in FIG. 11 may be defined by the TDD slot structure element shown in FIG. 15. Here, the Slot Structure Control field may be defined as shown in FIG. 16.

A Number of TDD Slots per TDD Interval subfield indicates the number of TDD slots in each TDD interval. GT1 Duration, GT2 Duration, and GT3 Duration subfields indicate the length of the guard times corresponding to GT1, GT2, and GT3 in FIG. 11 in microseconds. An Allocation ID subfield is set equal to the value of the Allocation ID subfield in the Allocation Control field of the extended schedule element that defines TDD SP allocation.

Although not shown in FIG. 16, a Reserved subfield of FIG. 16 may include a one-bit Allocation Block Duration Validity subfield and an eight-bit Reserved Subfield depending on embodiments. Here, the Allocation Block Duration Validity subfield may be set to 0 if the length of a TDD SP is not limited to be across successive BIs. Alternatively, the length of the SP may be limited by the value of the TDD SP Block Duration (or Allocation Block Duration) subfield. In this case, the Allocation Block Duration Validity subfield may be set to 1.

A Slot Structure Start Time subfield indicates the lower 4 octets of a timing synchronization function (TSF) timer at the start of the first TDD SP in which the slot structure takes effect.

A TDD SP Duration (or Allocation Block Duration) indicates the length of the TDD SP in microseconds.

A Slot Structure (or Slot Schedule) field may be defined as shown in FIG. 17. The field may have a size of M octets equal to the value of the Number of TDD Slots per TDD Interval subfield. In FIG. 17, the TDD Slot i Duration subfield (1≤i≤M) indicates the length of the i-th TDD slot in each TDD interval in microseconds.

FIG. 18 is a diagram schematically illustrating a TDD slot schedule element applicable to the present invention, and FIG. 19 is a diagram schematically illustrating a Slot Schedule Control field in the TDD slot schedule element. A Slot Category Schedule field in FIG. 18 and a TDD Slot Schedule Duration subfield in FIG. 19 may be selectively excluded depending on embodiments.

The TDD slot schedule element shown in FIG. 18 defines access assignments of TDD slots in a TDD SP for (DMG) STAs. Here, the Slot Schedule Control field in FIG. 18 may be defined as shown in FIG. 19.

A Channel Aggregation subfield may indicate whether channel aggregation is performed, and a BW subfield may indicate one or more channels used for PPDU transmission.

A Slot Schedule Start Time subfield indicates the lower 4 octets of a TSF timer at the start of the first TDD interval in which a corresponding schedule takes off.

A Number of TDD Intervals in the Bitmap subfield indicates the number of TDD intervals described in a Bitmap and Access Type Schedule field following a time indicated by the Slot Schedule Start Time subfield.

An Allocation ID subfield is set equal to the value of the Allocation ID subfield in the Allocation Control field of the extended schedule element that defines TDD SP allocation.

A TDD Slot Schedule Duration subfield indicates, in microseconds, an interval from the start of the first TDD interval, in which a corresponding schedule takes off, to the end of the last TDD interval.

The Bitmap and Access Type Schedule field defines the type of a TDD slot and permission for the access of an (DMG) STA to TDD slots covered by a corresponding bitmap. Each pair of successive two bits indicates the type of a TDD slot and access permission as shown in Table 2 below. A (binary) value of 00 indicates that a TDD slot is unassigned. A (binary) value of 01 indicates that an STA is assigned a simplex RX TDD slot, and a (binary) value of 10 value indicates that an STA is assigned a simplex TX TDD slot. A (binary) value of 11 may be reserved or unavailable.

The size of the Bitmap and Access Type Schedule field is determined based on a function of the value (e.g., M) of the Number of TDD Slots per TDD Interval subfield in the TDD slot structure element and the value (e.g., Q) of the Number of TDD Intervals in the Bitmap subfield. If padding is required to make this field have an integer size, a TDD Slot of Type Unassigned is used. TDD slots defined by the Bitmap and Access Type Schedule field are repeated during an interval indicated by the value of the TDD Slot Schedule Duration subfield.

Here, a PCP/AP and another neighboring PCP/AP may share each other's TDD scheduling information to coexist therewith and may control interference applied (or incurred) to each other's BSSs using the corresponding information.

Also, the PCP/AP may request the amount of interference experienced by STAs during a TDD SP from the STAs, may receive a report on the amount of interference from the STAs, and may allocate an optimal TDD slot for the STAs considering the amount of interference experienced by the STAs in the next scheduling using the information. As a result, the performance of the system may be improved compared with a conventional system.

Hereinafter, a method of measuring a channel condition experienced by a PCP/AP or STAs in a TDD SP and reporting measurement information will be described in detail according to the present invention.

According to the present invention, a TDD SP allocation procedure may be performed based on channel information of the PCP/AP or STAs.

To this end, the PCP/AP may request the STAs to measure interference, noise, signal-to-noise ratio (SNR), or signal-to-interference plus noise ratio (SINR) experienced by the STAs during the TDD SP. In response, the requested STAs may measure the condition of a channel according to a

TABLE 2

| | Operation between AP or PCP DMG STA and non-AP and PCP DMG STA during TDD slot | |
|---|---|---|
| Encoding | Behavior of AP and PCP STA | Behavior of Non-AP and non-PCP STA |
| 0 | N/A; TDD slot unassigned | |
| 1 | TX | RX |
| 2 | RX | TX |
| 3 | Unavailable | |

| Sub-fields | Allocation ID | Allocation Type | Pseudo-static | Truncat-able | Extend-able | PCP Active | LP SC Used | SP with TDD Channel Access | Re-served |
|---|---|---|---|---|---|---|---|---|---|
| Bits | 4 | 3 | 1 | 1 | 1 | 1 | 1 | 1 | 3 |

A Slot Category Schedule field may define a TDD slot category. Each pair of successive two bits indicates a frame type(s) allowed to be transmitted in a corresponding TDD slots defined by the Bitmap and Access Type Schedule field. A value of 0 (or a binary value of 00) indicates a basic TDD slot, and a value of 1 (or a binary value of 01) indicates a data-only TDD slot. A value of 2 (or a binary value of 10) or a value of 3 (or a binary value of 11) may be reserved. The size of the Slot Category Schedule field is determined based on a function of the value (e.g., M) of the Number of TDD Slots per TDD Interval subfield in the TDD slot structure element and the value (e.g., Q) of the Number of TDD Intervals in the Bitmap subfield. If padding is required to make this field have an integer size, a Reserved TDD Slot Category is used.

3. Embodiments to which the Present Invention is Applicable

Hereinafter, technical features proposed in the present invention will be described in detail based on the foregoing technical idea.

More specifically, the above-described TDD scheduling enables fast and efficient data transmission of the entire system, thereby improving system performance.

requested measurement method during the TDD SP and may feed interference, noise, SNR, or SINR back to the PCP/AP. Upon receiving the feedback, the PCP/AP may schedule the individual STAs to be allocated to an interval having a good channel condition using the feedback information.

Figure 20:
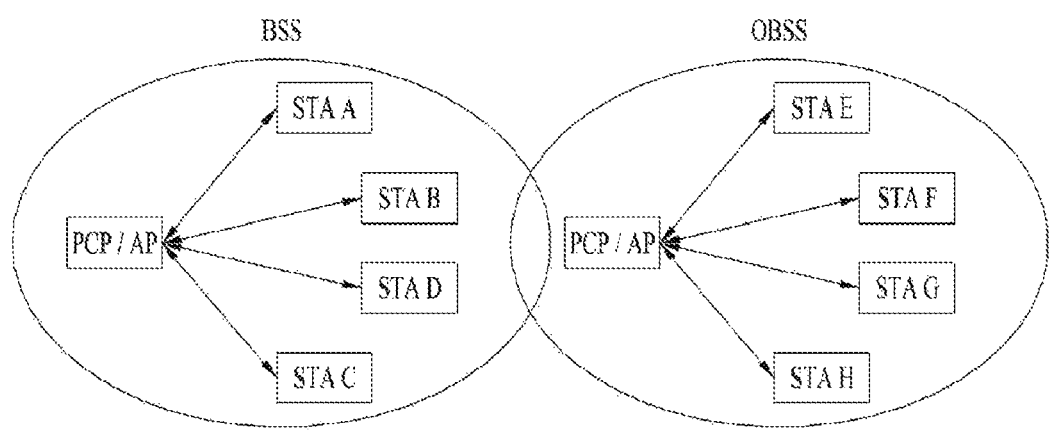
FIG. 20 is a diagram schematically illustrating a configuration of a PCP/AP and STAs applicable to the present invention.
Figure 21:
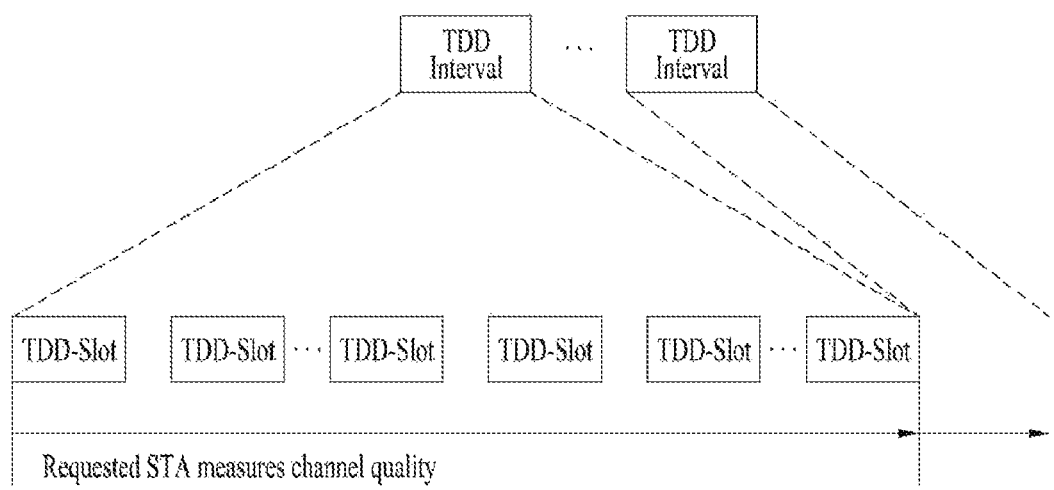
FIG. 21 is a diagram schematically illustrating an operation of performing channel measurement by STAs according to the present invention.

FIG. 20 is a diagram schematically illustrating a configuration of a PCP/AP and STAs applicable to the present invention, and FIG. 21 is a diagram schematically illustrating an operation of performing channel measurement by STAs according to the present invention.

In the configuration shown in FIG. 20, the STAs may perform channel measurement for a TDD SP according to one or more methods illustrated below.

The STAs measure a channel (e.g., interference, noise, SNR, and SINR) during the TDD SP or longer.

The STAs measure a channel (e.g., interference, noise, SNR, and SINR) during the TDD SP.

The STAs measure a channel (e.g., interference, noise, SNR, and SINR) per TDD interval within the TDD SP.

The STAs measure a channel (e.g., interference, noise, SNR, and SINR) per TDD slot within a TDD interval within the TDD SP.

According to one embodiment of the present invention, a PCP/AP of a BSS may request STA A and STA B to perform channel measurement according to one or more of the foregoing methods during the TDD SP. A request frame may be transmitted during a BTI or ATI or may also be transmitted during a DTI or the TDD SP.

Referring to FIG. 21, upon receiving the request frame from the PCP/AP, STA A and STA B may measure a channel based on a corresponding method during a corresponding time according to duration and a measurement method set by the PCP/AP. A channel condition experienced by STA A and STA B may be affected by transmission and reception by STAs in the BSS and an OBSS.

According to the present invention, a STA requested to measure a channel may measure a channel according to one or more methods illustrated below.

When measuring a channel, the STA measures the power strength of a signal received from both the BSS and the OBSS. Here, the STA may determine the strength of a signal as interference and may report interference in a specific interval to the PCP/AP.

When measuring a channel, the STA measures only the strength of a signal received from the OBSS. Since the strength of a signal received from the BSS may be changed according to next TDD SP scheduling of the BSS, it is more effective to measure only the strength of the signal received from the OBSS for TDD scheduling considering interference. Here, the STA may decode an MAC header of a received packet, and may determine that the packet is a packet from the OBSS if the MAC address of the AP is not included in an MAC Address Transmitter Address (TA)/Receiver Address (RA) field. The STA may measure the amount of interference by measuring the strength of the signal and may report the interference in a specific interval to the PCP/AP of the BSS.

When measuring a channel, the STA may measure SINR (or SNR). For channel measurement during the TDD SP, the PCP/AP may allocate a TDD interval or a TDD slot for channel measurement to the STAs. The allocated STAs may measure SINR (or SNR) through a packet transmitted by the PCP/AP during the allocated intervals and may report the result of measurement to the PCP/AP.

Subsequently, the PCP/AP according to the present invention may measure a channel according to one or more methods illustrated below.

The PCP/AP may measure SINR/SNR/the strength of interference through a packet received from the STA(s) during a UL interval. In next TDD SP scheduling considering the channel measurement result, the PCP/AP may allocate a TDD slot having the best channel condition for each STA, thereby maximizing performance in the UL interval.

The PCP/AP may perform channel measurement by separately distinguishing the strength of interference received from the BSS and that from the OBSS in the channel measurement method described above.

Hereinafter, a specific signal transmission and reception method for channel measurement of an STA and a PCP/AP will be described in detail. Hereinafter, although applicable signal transmission and reception methods are separately described for the convenience of explanation, signal transmission and reception methods applicable to the present invention may include a signal transmission and reception method in which all/some (compatible) features are combined in the following various signal transmission and reception methods.

3.1. First Signal Transmission/Reception Method

An STA or a PCP/AP may use a measurement request element and a measurement report element to measure a channel (e.g., interference, noise, SNR, and SINR) per TDD slot within a TDD interval within a TDD SP.

FIG. 22 is a diagram schematically illustrating a measurement request element according to a related art, and FIG. 23 is a diagram schematically illustrating a measurement report element according to a related art. The measurement request element shown in FIG. 22 may correspond to a measurement request field format for a directional channel quality request in which a measurement type is set to a directional channel quality, and the measurement report element shown in FIG. 23 may correspond to a measurement report field format for a directional channel quality report in which a measurement type is set to a directional channel quality.

In FIG. 22, an Operating Class field indicates a channel set to which a measurement request is applied. The Operating Class field and a Channel Number field specify a channel frequency and channel spacing for the measurement request together. The Channel Number field indicates a channel number to which the measurement request is applied. An AID field indicates a target STA.

A Measurement Method field indicates a method for a requested STA to carry out a measurement request and to carry out a measurement report. This field set to 0 may indicate an average noise plus interference power indicator (ANIPI). This field set to 1 may indicate a received signal-to-noise indicator (RSNI).

A Measurement Start Time field is set to a TSF timer at the time when the requested measurement starts. Here, a value of 0 may indicate that the measurement starts immediately.

A Measurement Duration field is set to the preferred or mandatory duration of the requested measurement, expressed in TUs (e.g., 1 TU=1024 usec).

A Number of Time Blocks field indicates the number of time blocks in measurement duration. The ratio of Measurement Duration/Number of Time Blocks provides an interval in an individual measurement unit.

An Optional Subelements field may include zero or more subelements, and each subelement may include a one-octet Subelement ID field, a one-octet Length field, and a Data field having a variable length.

In FIG. 23, an Operating Class field indicates a channel set to which a measurement report is applied. The Operating Class field and a Channel Number field specify a channel frequency and channel spacing for the measurement report together. The Channel Number field indicates a channel number to which the measurement report is applied. An AID field indicates a target STA.

A Measurement Method field indicates a method for an STA to carry out a measurement request and the format of a Measurement for Time Block field(s). This field set to 0 may indicate that the Measurement for Time Block field(s) is expressed in ANIPIs. This field set to 1 may indicate that the Measurement for Time Block field(s) is expressed in RSNIs.

A Measurement Start Time field is set to the value of a TSF timer of a measuring STA at the time when measurement starts.

A Measurement Duration field is set to measurement duration expressed in TUs (e.g., 1 TU=1024 usec).

A Number of Time Blocks field indicates the number of time blocks in measurement duration. The ratio of Measurement Duration/Number of Time Blocks ratio provides an interval in an individual measurement unit.

The Measurement for Time Block field (s) indicates channel measurement information within individual measurement duration.

An Optional Subelements field may include zero or more subelements, and each subelement may include a one-octet Subelement ID field, a one-octet Length field, and a Data field having a variable length.

The measurement request/report for the measurement type of the directional channel quality may be utilized for a TDD channel access structure for performing directional transmission/reception with a target STA.

However, according to the above related art, the measurement duration is defined only in TUs (1 TU=1024 usec) and thus cannot be used for measurement in TDD slot duration defined in 1 usec. That is, since TDD slot duration defined in TDD channel access is defined in 1 usec, it is impossible to support channel measurement in TDD slots using the measurement duration according to the related art. Therefore, the conventional measurement method cannot support optimized TDD slot scheduling.

Accordingly, the present invention proposes, as a signal transmission and reception method for supporting channel measurement in TDD slots, a signal transmission and reception method that changes measurement duration to a 1 usec, which is the unit of a TDD slot, in order to enable channel measurement in TDD slots for STAs participating in TDD channel access.

In one example, the PCP/AP may signal to the STA that a measurement request element is a measurement request element for TDD channel access using a particular field of the measurement request element. The STA(s) receiving (or decoding) the signal may interpret measurement duration in the measurement request element as a unit of TU/1024 instead of a TU and may perform channel measurement per (in a unit of) TU/1024.

Here, the particular field may be a Reserved field or the Measurement Method field in FIG. 22.

More specifically, the Reserved field in FIG. 22 set to a first value (e.g., 0) may indicate that the value of the Measurement Duration field indicates a channel interval in TUs. The Reserved field in FIG. 22 set to a second value (e.g., 1) may indicate that the value of the Measurement Duration field indicates a channel interval in a unit of TU/1024 (i.e., 1 usec).

In another example, the Measurement Method field in FIG. 22 may be configured as shown in the following table to indicate a channel interval in a unit of TU or TU/1024 (i.e., 1 usec).

TABLE 3

| Measurement Method field | Description |
| --- | --- |
| Set to 0 | ANIPI |
| Set to 1 | RSNI |
| Set to 2 | ANIPI for TDD SP |
| Set to 3 | RSNI for TDD SP |
| Other values | Reserved |

According to the table, the Measurement Method field set to 2 may indicate an ANIPI for measurement duration requested in 1 μs, and the Measurement Method field set to 3 may indicate an RSNI for measurement duration requested in 1 μs. Accordingly, when the Measurement Method field is set to 2 or 3, the Measurement Duration field may be set to the length of measurement duration requested in 1 μs (or may indicate the length of the measurement duration).

According to the foregoing method, an STA requested to perform channel measurement per TDD slot may signal to an STA that a measurement report element is a measurement report element for TDD channel access using a particular field of the measurement report element. The STA or PCP/AP receiving (or decoding) the signal may interpret measurement duration in the measurement request element as a unit of TU/1024 instead of a TU and may assume that channel measurement per (in a unit of) TU/1024 has been performed.

Here, the particular field may be the Reserved field or the Measurement Method field in FIG. 22.

For example, when the Measurement Method field is used as the particular field, the Measurement Method field set to 2 may indicate that the Measurement for Time Block field(s) is represented by an ANIPI for measurement duration requested in 1 μs, and the Measurement Method field set to 3 may indicate that the Measurement for Time Block field(s) is represented by an RSNI for measurement duration requested in 1 μs. Accordingly, when the Measurement Method field is set to 2 or 3, the Measurement Duration field may be set to the length of measurement duration requested in 1 μs (or may indicate the length of the measurement duration).

Alternatively, for STAs participating in a TDD SP (e.g. STAs receiving a TDD SP structure element and a TDD slot schedule element), a unit for measurement duration in a measurement request/report element may be interpreted/assumed to be 1 usec without additional signaling. That is, the STAs participating in the TDD SP (e.g. the STAs receiving the TDD SP structure element and the TDD slot schedule element) may perform channel measurement assuming that a unit for measurement duration in a received measurement request element is 1 usec without additional signaling, and the PCP/AP or the STA receiving a channel report from the STAs may assume that channel measurement has been performed assuming that a unit for measurement duration in a received measurement report element is 1 usec.

Further, since all STAs may not be able to perform channel measurement per 1 usec, the PCP/AP and the STA may exchange capability information about channel measurement per 1 usec when establishing a BSS.

Accordingly, the STA may indicate whether channel measurement per 1 usec is possible using particular signaling (e.g., reserved one bit of a DMG STA Capability Information field) as a Measurement Unit subfield. More specifically, the STA may set the Measurement Unit subfield to 1, thereby indicating that the STA supports measurement per 1 usec. If the STA does not support measurement per 1 usec, the subfield may be set to zero.

According to the foregoing configuration, an STA capable of channel measurement per 1 usec based on the conventional measurement element format may measure and report a channel per 1 usec, and the PCP/AP may efficiently configure a TDD SP structure based on channel measurement per 1 usec. That is, when the PCP/AP schedules a TDD slot based on channel measurement per 1 usec, the STA can perform channel measurement in accordance with the TDD SP structure, and the PCP/AP can obtain channel measurement information according to the TDD SP structure.

3.2. Second Signal Transmission/Reception Method

As described above, a measurement request/report for a measurement type of a directional channel quality may be suitable for a TDD channel access structure for performing directional transmission and reception with a target STA.

However, unlike in the first signal transmission/reception method, assuming that signal measurement is performed per divided block, each block interval may be defined as measurement duration/the number of time blocks. Here, individual block duration may be different from the duration of TDD slots in a TDD interval. That, an STA cannot perform accurate channel measurement for a TDD slot structure.

Figure 25:
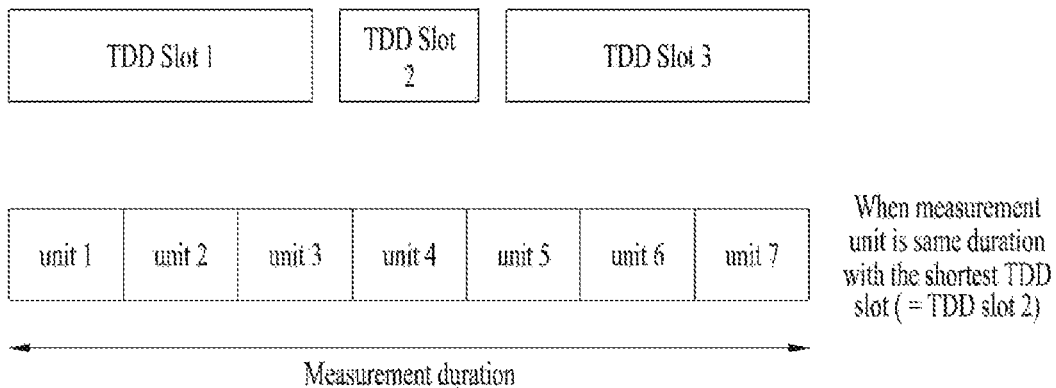
Figure 26:
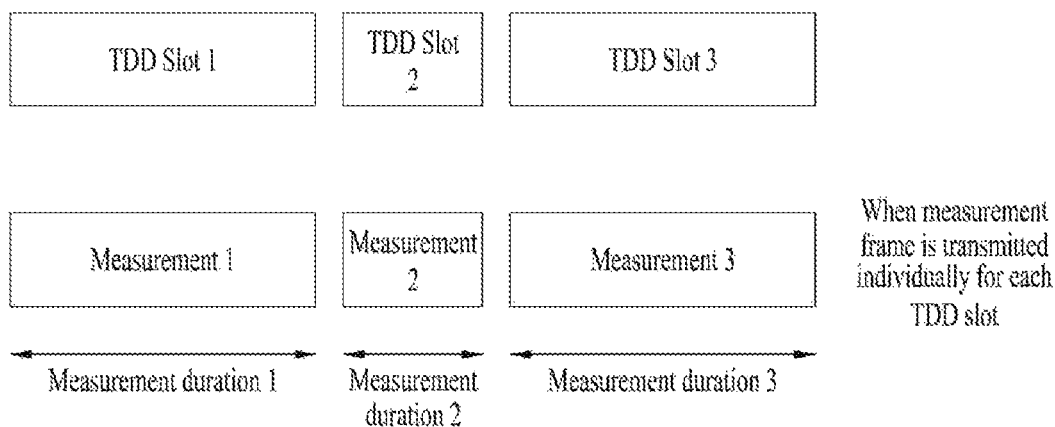

FIGS. 24 to 26 illustrate examples of setting a measurement unit to various TDD slot lengths.

As shown in FIG. 24, when a measurement unit has the same length as TDD slot 1, measurement unit 2 includes part of the duration of TDD slot 3, and thus TDD slot 2 cannot be properly measured. In addition, the length of measurement unit 3 is shorter than the duration of TDD slot 3, and thus TDD slot 3 cannot be properly measured.

As shown in FIG. 25, when a measurement unit has the same length as TDD slot 2, which is the shortest TDD slot, measurement units are not aligned with TDD slots, and thus all the TDD slots cannot be properly measured. In addition, if there are many TDD slots in a TDD SP, feedback overhead may be very high.

As shown in FIG. 26, a measurement frame is transmitted for each TDD slot, and thus individual measurement duration can be set/assigned for each TDD slot. In this case, each TDD slot can be properly measured. However, if there are many TDD slots in a TDD SP, it is required to transmit separate measurement request frames, which may be very inefficient.

Therefore, in the second signal transmission/reception method according to the present invention, the value of each field of a measurement request element may be assumed as follows.

A Measurement Duration field is set to indicate the entire interval for measuring a channel within a TDD SP.
The Number of Time Blocks field is set to indicate the number of TDD slots.

For this assumption, separate signaling may be provided to STAs, or STAs participating in the TDD SP may assume the foregoing fields as described above without additional signaling.

That is, it is signaled to the STAs that the Number of Time Blocks field indicates the number of TDD slots through a particular field (e.g., reserved bit (one bit), a Measurement Method field, or the like) in a measurement request/report element, or the Number of Time Blocks field may be set in advance to be recognized as the number of TDD slots by the STAs participating in the TDD SP.

Since the STAs participating in the TDD SP knows a TDD slot structure and the length of each TDD slot in the TDD slot structure, the STAs may perform channel measurement per TDD slot based on the above assumption and may report the result of measurement to a PCP/AP.

In the foregoing configuration, an embodiment of using the Measurement Method field as a method of indicating to the STAs participating in the TDD SP that the Number of Time Blocks field indicates the number of TDD slots is as follows.

TABLE 4

| Measurement Method field | Description |
| --- | --- |
| Set to 0 | ANIPI |
| Set to 1 | RSNI |
| Set to 2 | ANIPI for TDD SP |
| Set to 3 | RSNI for TDD SP |
| Other values | Reserved |

That is, the Measurement Method field set to 2 or 3 indicates an ANIPI or RSNI measurement method used in the TDD SP.

An STA receiving the measurement request element having the Measurement Method field set to 2 or 3 may perform channel measurement and report assuming/recognizing the Number of Time Blocks field in the measurement request/report element as the number of TDD slots.

3.3. Third Signal Transmission/Reception Method 3.3.1. Measurement Request Element Transmission Method 3-1

A PCP/AP may transmit a channel measurement request to an STA using the format of an Allocation Control subfield of an extended schedule element. For example, the PCP/AP may indicate a TDD SP in a DTI to the STA through the TDD Applicable SP field in the extended schedule element format illustrated in FIG. 14.

Also, the PCP/AP may configure a Measurement for TDD SP subfield using one bit of the reserved bits in FIG. 14, thereby indicating to the STA that the TDD SP is a TDD SP for channel measurement. Accordingly, this subfield value set to 1 may indicate that the PCP/AP requests the STA to perform channel measurement during the TDD SP. Here, parameters affecting transmission/reception quality, such as SINR, SNR, interference, and noise, may be applied to a channel measurement method. This subfield value set to 0 may indicate that the PCP/AP and the STA perform data transmission and reception in the TDD SP according to the conventional definition.

3.3.2. Measurement Request Element Transmission Method 3-2

As described above, a PCP/AP indicate an operation of STAs in an allocated TDD slot in a TDD interval through the Bitmap and Access Type Schedule subfield in the TDD slot schedule element format illustrated in FIG. 18.

Here, the PCP/AP may set the Bitmap and Access Type Schedule subfield to a value of 0 (or 00 in binary) or 3 (or 11 in binary), thereby flexibly indicating a TDD slot for performing channel measurement to the STAs per TDD slot. Alternatively, the PCP/AP may indicate to the STAs through the subfield whether channel measurement is performed for the entire TDD interval or the entire TDD SP.

3.3.3. Measurement Request Element Transmission Method 3-3

Figure 27:
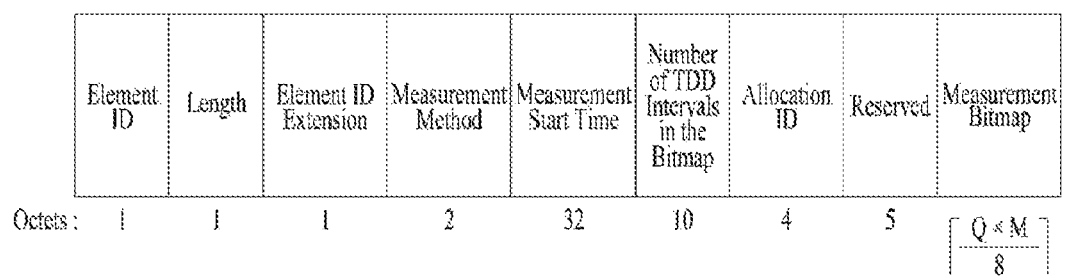
FIG. 27 is a diagram schematically illustrating an element format for requesting channel measurement per TDD slot according to an embodiment of the present invention.

The present invention proposes an element format illustrated in FIG. 27 as an element format for requesting channel measurement per TDD slot.

FIG. 27 is a diagram schematically illustrating an element format for requesting channel measurement per TDD slot according to the present invention. Hereinafter, for the convenience of explanation, this element format is referred to as a TDD channel measurement element format.

In FIG. 27, a Measurement Method field set to 1 may indicate measurement of interference and noise levels, and the Measurement Method field set to 0 may indicate a request for measurement of an SINR value by an STA. That is, when the Measurement Method field is 1, the STA measures interference and noise levels in a TDD slot. When the Measurement Method field is 0, the STA measures an SINR value in the TDD slot.

A Number of TDD Intervals in the Bitmap field indicates the value of Q.

An Allocation ID field is the same value as the Allocation ID field of the Allocation Control subfield in a TDD SP.

A Measurement Bitmap field indicates whether the STA performs channel measurement in a successive TDD slots. For example, when this field is 1, the STA performs channel measurement in the TDD slots. When this field is 0, the STA does not perform channel measurement in the TDD slots.

An Allocation ID field is the same value as the Allocation ID field of the Allocation Control subfield in a TDD SP.

3.3.4. Measurement Request Element Transmission Method 3-4

The present invention proposes an element format illustrated in FIG. 28 as an element format for requesting channel measurement per TDD slot in view of a BW and an antenna.

FIG. 28 is a diagram schematically illustrating an element format for requesting channel measurement per TDD slot according to the present invention. Hereinafter, for the convenience of explanation, this element format is referred to as a TDD channel measurement element format. FIG. 29 is a diagram schematically illustrating a Measurement Control field in FIG. 28.

A Measurement Channel Bitmap field indicates a channel to be measured via a bitmap.

A Channel Measurement Report Method field indicates a channel measurement method. This field set to 0 indicates that a channel indicated via a channel bitmap is separately measured, and this field set to 1 indicates that the average power of channels is measured.

An Antenna Measurement Report Method field indicates an antenna measurement method. This field set to 0 indicates that an antenna is separately measured, and this field set to 1 indicates that the average of power received by all antennas is measured.

Other fields may be defined the same as defined in Section 3.3.3.

3.3.5. Measurement Request Element Transmission Method 3-5

A PCP/AP may request an STA to measure a channel per TDD interval by modifying the Measurement Bitmap field in the TDD slot-based channel measurement request method described above in Section 3.3.3 or 3.3.4.

In Section 3.3.3 or 3.3.4, Q indicates the number of TDD intervals in a TDD SP, and M indicates the number of TDD slots in a TDD interval. The PCP/AP may request the STA to measure a channel during each TDD interval using a measurement bitmap defined by parameter Q. FIG. 30 is a diagram schematically illustrating an element format for requesting channel measurement per TDD interval according to the present invention Hereinafter, a method in which an STA feeds back measured channel information when channel measurement is requested by the foregoing various methods will be described in detail.

3.3.6. Measurement Report Element Transmission Method 3-1

An STA may feed back channel measurement information using a new frame format illustrated in FIG. 31 based on the values of a Channel Measurement Report Method field and an Antenna Measurement Report Method field.

FIG. 31 is a diagram schematically illustrating a frame format that is applicable when both a Channel Measurement Report Method subfield and an Antenna Measurement Report Method subfield are set to 0. As illustrated in FIG. 31, when the Channel Measurement Report Method subfield and the Antenna Measurement Report Method subfield are all set to 0, the STA may report individual channel measurement information relating to each channel and each antenna to a PCP/AP through the frame format illustrated in FIG. 31.

Here, N indicates the number of pieces of bit information indicated by 1 in a Measurement Bitmap field (3110). That is, the Measurement Bitmap field (3110) indicates intervals in which the STA measures a channel, and the STA may report, to the PCP/AP, channel measurement information (e.g., the number of antennas (3120 #1 to 3120 #N) and the channel measurement result per antenna about a corresponding channel(3130 #1 to 3130 #N) relating to an interval indicated by 1 in the Measurement Bitmap field in a measurement bitmap order.

3.3.7. Measurement Report Element Transmission Method 3-2

An STA may feed back channel measurement information using a new frame format illustrated in FIG. 32 based on the values of a Channel Measurement Report Method field and an Antenna Measurement Report Method field.

FIG. 32 is a diagram schematically illustrating a frame format that is applicable when a Channel Measurement Report Method subfield is set to 0 and an Antenna Measurement Report Method subfield is set to 1. As illustrated in FIG. 32, when the Channel Measurement Report Method subfield is set to 0 and the Antenna Measurement Report Method subfield is set to 1, the STA may report average channel measurement information relating to all antennas per channel to a PCP/AP through the frame format illustrated in FIG. 32.

As described above, N indicates the number of pieces of bit information indicated by 1 in a Measurement Bitmap field. That is, the Measurement Bitmap field indicates intervals in which the STA measures a channel, and the STA may report, to the PCP/AP, channel measurement information (e.g., the average channel measurement result relating to all antennas per channel) relating to an interval indicated by 1 in the Measurement Bitmap field in a measurement bitmap order.

3.3.8. Measurement Report Element Transmission Method 3-3

An STA may feed back channel measurement information using a new frame format illustrated in FIG. 33 based on the values of a Channel Measurement Report Method field and an Antenna Measurement Report Method field.

FIG. 33 is a diagram schematically illustrating a frame format that is applicable when a Channel Measurement Report Method subfield is set to 1 and an Antenna Measurement Report Method subfield is set to 0. As illustrated in FIG. 32, when the Channel Measurement Report Method subfield is set to 1 and the Antenna Measurement Report Method subfield is set to 0, the STA may report average channel measurement information relating to all channels per antenna to a PCP/AP through the frame format illustrated in FIG. 33.

As described above, N indicates the number of pieces of bit information indicated by 1 in a Measurement Bitmap field. That is, the Measurement Bitmap field indicates intervals in which the STA measures a channel, and the STA may report, to the PCP/AP, channel measurement information (e.g., the average channel measurement result relating to all channels per antenna) relating to an interval indicated by 1 in the Measurement Bitmap field in a measurement bitmap order 3.4. Conclusion Hereinafter, a method of transmitting and receiving channel measurement information that is applicable to the present invention will be described in detail. For the convenience of explanation, it is assumed that an STA transmitting channel measurement information is a non-AP STA and an STA receiving channel measurement information is a PCP/AP. However, the technical configuration proposed in the present invention is not limited thereto but may be applied to various embodiments (e.g., where both an STA transmitting channel measurement information and an STA receiving channel measurement information are non-AP STAs).

Figure 34:
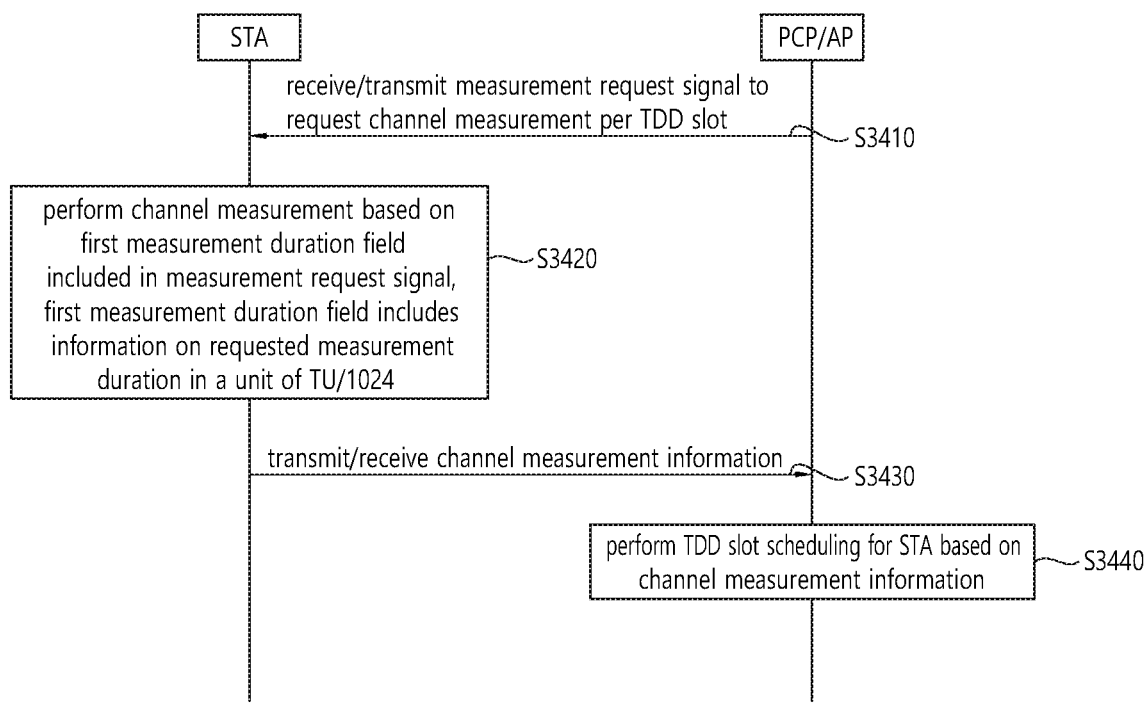
FIG. 34 is a diagram schematically illustrating an operation of transmitting and receiving channel measurement information between an STA and a PCP/AP according to an embodiment of the present invention.
Figure 35:
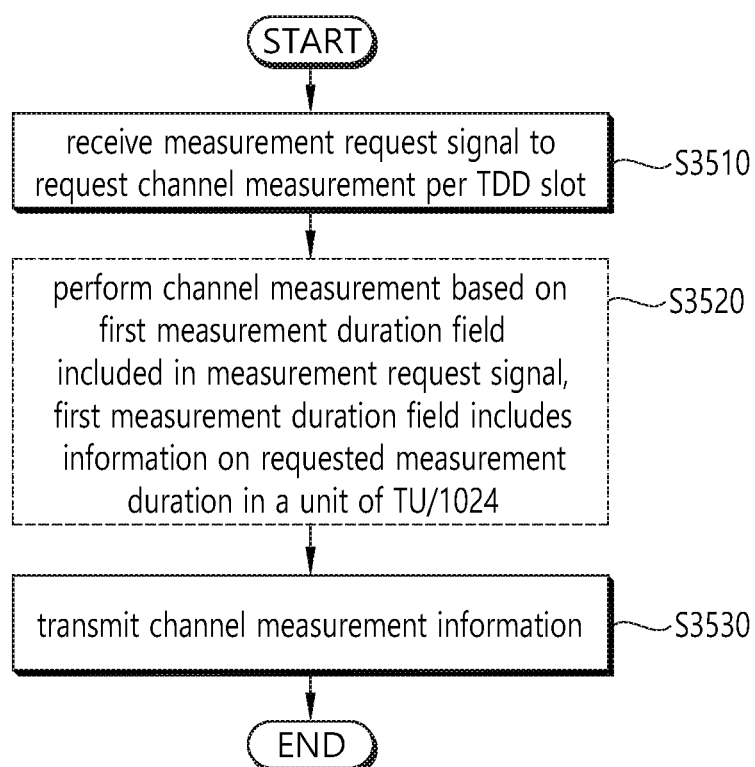
FIG. 35 is a flowchart schematically illustrating a channel measurement information transmission method of a STA according to the present invention.
Figure 36:
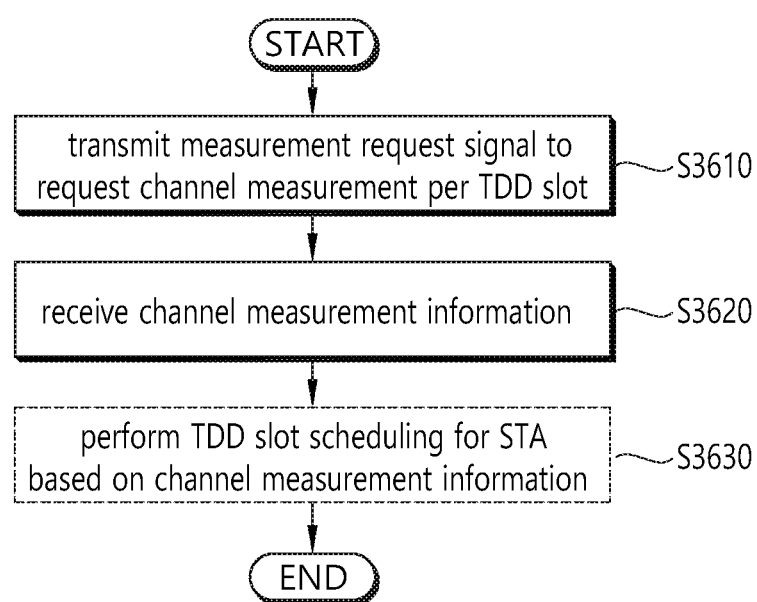
FIG. 36 is a flowchart schematically illustrating a channel measurement information reception method of a PCP/AP according to the present invention.

FIG. 34 is a diagram schematically illustrating an operation of transmitting and receiving channel measurement information between an STA and a PCP/AP according to an embodiment of the present invention, FIG. 35 is a flowchart schematically illustrating a channel measurement information transmission method of a STA according to the present invention, and FIG. 36 is a flowchart schematically illustrating a channel measurement information reception method of a PCP/AP according to the present invention.

The PCP/AP transmits, to the STA, a measurement request signal to request channel measurement per (in a unit of) time unit (TU)/1024 (S3410 and S3610). The STA receives the measurement request signal to request the channel measurement per (in a unit of) TU/1024 from the PCP/AP (S3410 and S3510).

Next, the STA transmits measured channel measurement information to the PCP/AP (S3430 and S3530). The PCP/AP receives the channel measurement information from the STA (S3430 and S3620).

Here, in order to generate/configure the channel measurement information, the STA may perform channel measurement based on a First Measurement Duration field included in the measurement request signal, wherein the First Measurement Duration field comprises information on a requested measurement duration per the TU/1024 (S3420 and S3520). However, the channel measurement operation is merely an example for specifically describing an operation of transmitting and receiving channel measurement information according to the present invention, and the present invention may include any operation of transmitting and receiving channel measurement information measured based on a channel measurement operation different from the above operation.

The measurement request signal to request channel measurement per (in a unit of) TU/1024 may include information on (indicating) that the measurement request signal is a measurement request signal for channel measurement per (in a unit of) TU/1024. The information on (indicating) that the measurement request signal is the measurement request signal channel measurement per (in a unit of) TU/1024 may be received through a First Measurement Method field included in the measurement request signal or may be received through another field.

In the present invention, upon receiving the First Measurement Method field associated with an average noise plus interference power indicator (ANIPI) during the requested measurement duration in a unit of TU/1024, the STA may transmit the channel measurement information including an ANIPI measured during the requested measurement duration to the PCP/AP.

In this case, the First Measurement Method field associated with the ANIPI during the requested measurement duration in a unit of TU/1024 may be set to 2. Further, the channel measurement information may include: a Second Measurement Method field indicating (or including information on) that the channel measurement information is represented by the ANIPI during the requested measurement duration; and a Second Measurement Duration field indicating (or including information on) the requested measurement duration in a unit of TU/1024.

In the present invention, upon receiving the Measurement Method field associated with a received signal-to-noise indicator (RSNI) during the requested measurement duration in a unit of TU/1024, the STA may transmit the channel measurement information including an RSNI measured during the requested measurement duration to the PCP/AP.

In this case, the Measurement Method field associated with the RSNI during the requested measurement duration in a unit of TU/1024 may be set to 3. Further, the channel measurement information may include: a Second Measurement Method field indicating (or including information on) that the channel measurement information is represented by the RSNI during the requested measurement duration; and a Second Measurement Duration field indicating (or including information on) the requested measurement duration in a unit of TU/1024.

In the above operation, as illustrated in FIG. 11, a time interval in which the channel measurement is performed may be included in a service period (SP) included in a data transfer interval (DTI).

In the above operation, the TU/1024 may be equal to 1 microsecond.

In the present invention, the channel measurement information may include a Second Measurement Duration field indicating (or including information on) the requested measurement duration in a unit of TU/1024.

In the present invention, the measurement request signal may include a First Measurement Method field indicating (or including information on) an ANIPI or an RSNI as a measurement method during the requested measurement duration in the unit of TU/1024, and the channel measurement information may include a Second Measurement Method field indicating (or including information on) that the channel measurement information is represented by the ANIPI or the RSNI as the measurement method during the requested measurement duration.

Here, the STA may transmit, to the PCP/AP, channel measurement information per (in a unit of) time block in the requested measurement duration as the channel measurement information based on the information about the number of time blocks (e.g., a Number of Time Blocks field) included in the measurement request signal. Here, the information (M) about the number of time blocks included in the measurement request signal may be set to M satisfying N mod M=0 (i.e., M having a remainder of 0 when N is divided by M) among Ms satisfying 1≤M≤N based on measurement duration (N) indicated by the First Measurement Duration field included in the measurement request signal.

Further, the PCP/AP may perform TDD slot scheduling for the STA based on the channel measurement information (S3440 and S3640).

3. Device Configuration

Figure 37:
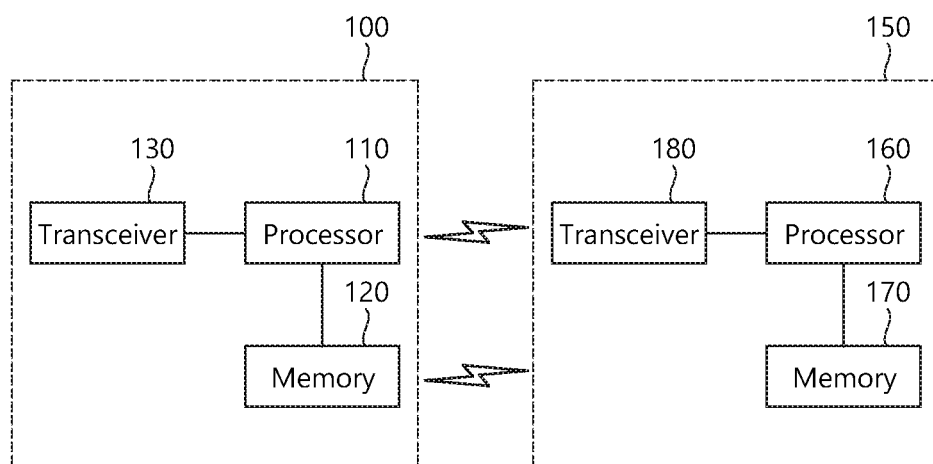
FIG. 37 is a diagram describing a device for implementing the above-described method.

FIG. 37 is a diagram describing a device for implementing the above-described method.

A wireless device 100 in FIG. 37 may correspond to an STA (e.g., a PCP/AP, an AP, or a non-AP STA) that transmits channel measurement information described above, and a wireless device 150 may correspond to an STA (e.g., a PCP/AP, an AP, or a non-AP STA) that receives the channel measurement information.

The transmission device 100 may include a processor 110, a memory 120, and a transceiver 130. The reception device 150 may include a processor 160, a memory 170, and a transceiver 180. The transceivers 130 and 180 may transmit/receive radio signals and may be implemented in a physical layer of IEEE 802.11/3GPP or the like. The processors 110 and 160 may be implemented in the physical layer and/or MAC layer and may be connected to the transceivers 130 and 180.

The processors 110 and 160 and/or the transceivers 130 and 180 may include an application-specific integrated circuit (ASIC), a chipset, a logic circuit, and/or a data processor. The memories 120 and 170 may include read-only memory (ROM), random-access memory (RAM), flash memory, a memory card, a storage medium, and/or other storage units. When an embodiment is executed by software, the methods described above may be executed as a module (e.g., a process or function) that performs the foregoing functions. The module may be stored in the memories 120 and 170 and may be executed by processors 110 and 160. The memories 120 and 170 may be located inside or outside the processors 110 and 160 and may be coupled to the processor 110 and 160 via a well-known means.

Alternatively, the processors 110 and 160 include a communication modem designed to implement wireless communication technologies (e.g., LTE, NR, and Wi-Fi). The memories 120 and 170 are connected to the processors 110 and 160 and store various pieces of information associated with the operation of the processors 110 and 160. For example, the memories 120 and 170 may perform some or all of the processes controlled by the processors 110 and 160 or may store a software code including commands to perform the procedures and/or methods described/proposed above. The transceivers 130 and 180 are connected to the processors 110 and 160 and transmit and/or receive radio signals. Here, the processors 110 and 160 and the memories 120 and 170 may be part of a processing chip (e.g., system-on-chip (SoC)).

According to the present invention, a communication device that transmits channel measurement information may include a memory and a processor. The processor may be configured to: receive a measurement request signal to request channel measurement per (in a unit of) TU/1024 from an AP; and transmit channel measurement information to the AP. Here, the channel measurement information may be measured based on a First Measurement Duration field, included in the measurement request signal, wherein the First Measurement Duration field comprises information on a requested measurement duration per the TU/1024.

According to the present invention, a communication device that receives channel measurement information may include a memory and a processor. The processor may be configured to: transmit a measurement request signal to request channel measurement per (in a unit of) TU/1024 to an STA; and receive channel measurement information from the STA. Here, the channel measurement information may be information measured based on a first measurement duration field included in the measurement request signal, wherein the First Measurement Duration field comprises information on a requested measurement duration per the TU/1024.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

INDUSTRIAL APPLICABILITY

Although the present invention has been described in detail under the assumption that the present invention can be applied to an IEEE 802.11 based wireless LAN (WLAN) system, the present invention will not be limited only to this. It will be understood that the present invention can be applied to diverse wireless systems capable of performing data transmission based on channel bonding by using the same method as presented herein.

What is claimed is:

1. A method for transmitting, by a station (STA), channel measurement information in a wireless local area network (WLAN) system, the method comprising:
   receiving, from an access point (AP), a measurement request signal to request a channel measurement; and
   in response to the measurement request signal, transmitting the channel measurement information to the AP,
   wherein the measurement request signal comprises a Measurement Duration field including information on a duration for which the channel measurement is requested,
   wherein the duration is set in a specific time unit,
   wherein the channel measurement information comprises channel information measured in the specific time unit based on the Measurement Duration field,
   wherein the specific time unit is a time unit (TU)/1024, and
   wherein a unit of measure for the TU is microseconds.

2. The method of claim 1, wherein the measurement request signal further comprises information on that the measurement request signal is a measurement request signal for the channel measurement per the TU/1024.

3. The method of claim 2, wherein the information on that the measurement request signal is the measurement request signal for the channel measurement per the TU/1024 is received through a Measurement Method field of the measurement request signal.

4. The method of claim 3,
   wherein the Measurement Method field indicates an average noise plus interference power indicator (ANIPI) measurement is performed during the duration, and
   wherein the channel measurement information comprises the ANIPI measurement.

5. The method of claim 4, wherein the Measurement Method field is set to 2 to indicate the ANIPI measurement.

6. The method of claim 3,
   wherein the Measurement Method field indicates a received signal-to-noise indicator (RSNI) measurement is performed during the duration, and
   wherein the channel measurement information comprises the RSNI measurement.

7. The method of claim 6, wherein the Measurement Method field is set to 3 to indicate the RSNI measurement.

8. The method of claim 1, wherein a time interval in which the channel measurement is performed is comprised in a service period (SP) included in a data transfer interval (DTI).

9. The method of claim 1, wherein the TU/1024 is equal to 1 microsecond.

10. A method for receiving, by an access point (AP), channel measurement information from a station (STA) in a wireless local area network (WLAN) system, the method comprising:
    transmitting a measurement request signal to request a channel measurement to the STA; and
    in response to the measurement request signal, receiving channel measurement information from the STA, wherein the measurement request signal comprises a Measurement Duration field including information on a duration for which the channel measurement is requested, wherein the duration is set in a specific time unit, wherein the channel measurement information comprises channel information measured in the specific time unit based on the Measurement Duration field, wherein the specific time unit is a time unit (TU)/1024, and wherein a unit of measure for the TU is microseconds.

11. The method of claim 10, wherein the measurement request signal further comprises a Measurement Method field indicating whether an ANIPI measurement method or an RSNI measurement method is performed during the duration.

12. The method of claim 10, further comprising:
performing, by the AP, time division duplex (TDD) slot scheduling for the STA based on the channel measurement information.

13. A communication device for transmitting channel measurement information in a wireless local area network (WLAN) system, the communication device comprising:

a memory; and a processor connected to the memory to process a signal transmitted to and received from another station device, wherein the processor is configured to:

receive a measurement request signal to request a channel measurement from an access point (AP); and in response to the measurement request signal, transmit channel measurement information to the AP, and wherein the measurement request signal comprises a Measurement Duration field including information on a duration for which the channel measurement is requested, wherein the duration is set in a specific time unit, wherein the channel measurement information comprises channel information measured in the specific time unit based on the Measurement Duration field, wherein the specific time unit is a time unit (TU)/1024, and wherein a unit of measure for the TU is microseconds.

* * * * *